United States Patent
Campbell et al.

(10) Patent No.: US 6,213,779 B1
(45) Date of Patent: Apr. 10, 2001

(54) CONIC SECTION ACTIVITY BOARDS

(76) Inventors: Jacqueline B. Campbell; Walter Campbell, both of 5915 Walnut St., Philadelphia, PA (US) 19139

( * ) Notice: Subject to any disclaimer, the term of this patent is extended or adjusted under 35 U.S.C. 154(b) by 0 days.

(21) Appl. No.: 09/538,781

(22) Filed: Mar. 30, 2000

(51) Int. Cl.[7] .............................. G09B 23/02; G09B 23/04
(52) U.S. Cl. .................... 434/211; 434/213; 434/214; 434/215; 434/216; 33/30.5; 33/27.01
(58) Field of Search .................... 434/87, 88, 85, 434/211, 212, 213, 214, 215, 216, 190, 186, 187; 33/18.1, 19.3, 21.1, 21.2, 27.01, 27.02, 30.1, 30.5, 666

(56) References Cited

U.S. PATENT DOCUMENTS

| | | |
|---|---|---|
| 155,726 | 10/1874 | Howson . |
| 639,488 | * 12/1899 | Ziethen . |
| 1,109,864 | 9/1914 | Nelson . |
| 1,541,179 | * 6/1925 | Parkinson . |
| 2,840,924 | * 7/1958 | Willis . |
| 2,885,796 | * 5/1959 | Feldhake . |
| 3,106,789 | * 10/1963 | McAlister, Jr. . |
| 3,287,829 | * 11/1966 | Minsky . |
| 3,339,297 | * 9/1967 | Stinn . |
| 3,345,752 | * 10/1967 | Gabriel . |
| 3,665,610 | 5/1972 | Schlau et al. ........................ 33/18 R |
| 4,740,161 | 4/1988 | Schwartz et al. .................... 434/162 |
| 5,492,472 | 2/1996 | Suarez .................................... 434/92 |

* cited by examiner

*Primary Examiner*—Jacob K. Ackun
*Assistant Examiner*—Bena B. Miller
(74) *Attorney, Agent, or Firm*—Henderson & Sturm LLP (57) ABSTRACT

The present invention provides a variety of laminated plastic activity boards that allow the individual to visualize and have interactive exploration of conic sections and their definitions. This allows for more class time to be spent investigating the concept of conic sections opposed to teachers lecturing and the students having to memorize them. The user is able to notice patterns which develop while drawing specific sets of conic sections by forming conjectures based on the observed outcomes of the activities. Each activity board has a reusable laminated surface which allows the ink used from a marker to be visible but not permanent. The surface can be wiped clean with a moist paper towel once the activity is completed. There are a total of four activity boards which operate independently of each other and contain different concepts. The four boards teach principles relating to the circle, ellipse, parabola and hyperbola. On the underside of the circle and eclipse activity boards is a string container which features a release and a retraction bar. By pressing the desired bar, the string will either be released or contracted. The string is pulled through a hole in the board and extended to a desired length for use on the activity side. The underside of the parabola and hyperbola activity boards carries a sliding tray that acts to pivotally secure a ruler in one of a number of aligned openings.

6 Claims, 7 Drawing Sheets

CONIC SECTION ACTIVITY BOARDS

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to the field of teaching devices, and more particularly to devices for enhancing the understanding of conic sections.

2. Description of Related Art

As can be seen by reference to the following U.S. Pat. Nos. 155,726; 1,109,864; 3,665,610; 4,740,161 and 5,492,472, the prior art is replete with myriad and diverse devices for teaching drafting and math skills.

While all of the aforementioned prior art constructions are more than adequate for the basic purpose and function for which they have been specifically designed, they are uniformly deficient with respect to their failure to provide a simple, efficient, and practical device for teaching the application of conic section definitions with hands-on visual and interactive encounters.

As a consequence of the foregoing situation, there has existed a longstanding need for new and improved conic section activity boards and the provision of such a construction is a stated objective of the present invention.

BRIEF SUMMARY OF THE INVENTION

Briefly stated, the present invention provides a variety of laminated plastic activity boards that allow the individual to visualize and have interactive exploration of conic sections and their definitions. This allows for more class time to be spent investigating the concept of conic sections opposed to teachers lecturing and the students having to memorize them. The user is able to notice patterns which develop while drawing specific sets of conic sections by forming conjectures based on the observed outcomes of the activities. Each activity board has a reusable laminated surface which allows the ink used from a marker to be visible but not permanent. The surface can be wiped clean with a moist paper towel once the activity is completed. There are a total of four activity boards which operate independently of each other and contain different concepts. The four boards teach principles relating to the circle, ellipse, parabola and hyperbola. On the underside of the circle and eclipse activity boards is a string container which features a release and a retraction bar. By pressing the desired bar, the string will either be released or contracted. The string is pulled through a hole in the board and extended to a desired length for use on the activity side. The underside of the parabola and hyperbola activity boards carries a sliding tray that acts to pivotally secure a ruler in one of a number of aligned openings.

The purpose of the activity boards is to equip the user with an interactive hands-on and visual encounter which allows exploration and reinforcement of the definitions of conic sections. The activity boards will allow for more class time to be spent investigating the concept of conic sections as opposed to lecturing and memorizing definitions. Users will become familiar with how circular, elliptical, parabolic and hyperbolic shapes are derived through use of concrete evidence of the definitions. The user will notice patterns which develop while drawing specific sets of conic sections and be able to predict the outcomes of future conic sections by forming conjectures based on the observed outcomes of these activities. Each activity board has a reusable laminated surface and is intended to be used with a pen that contains the same fluid as overhead marker pens. The activity board surface can be wiped clean with a moist paper towel after the activity is completed.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein.

DETAILED DESCRIPTION OF THE INVENTION

Figure 1:
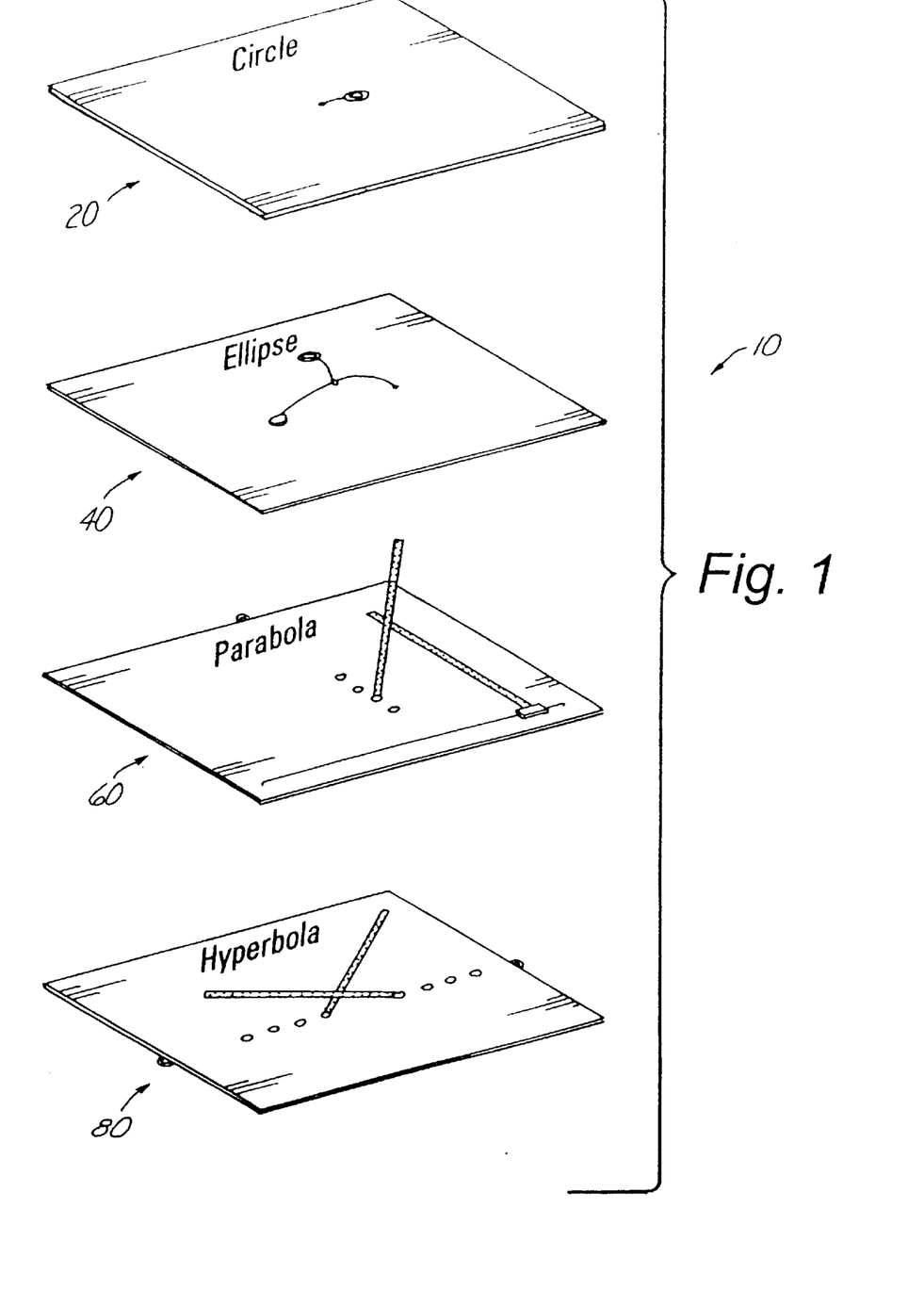
FIG. 1 is a perspective view showing each of the four conic section activity boards of the present invention.
Figure 2:
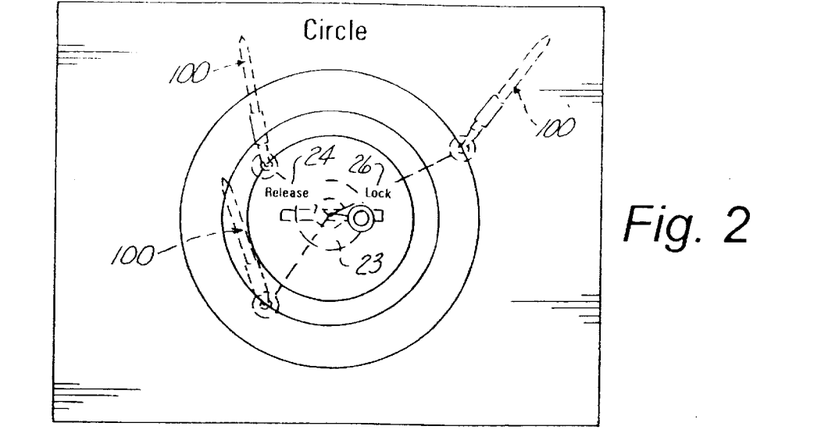
FIG. 2 is a top plan view of the activity board for circular conic sections.
Figures 3, 4, 5:
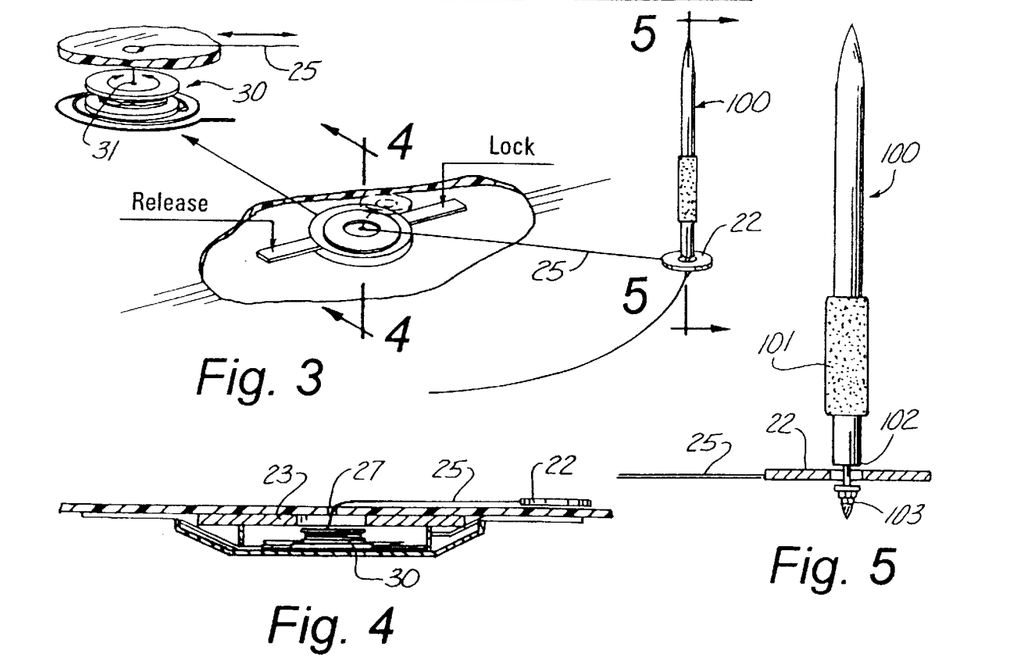
FIG. 3 is a cutaway partial perspective view illustrating the string releasing and locking mechanism used in the activity board of FIG. 2.
FIG. 4 is a side elevational sectional view taken along line 4—4 of FIG. 3 showing the string releasing and locking mechanism.
FIG. 5 is a side elevational sectional view taken along line 5—5 of FIG. 3.

As can be seen by reference to the drawings, and particularly to FIG. 1, the conic section activity boards that form the basis of the present invention is designated generally by the reference number 10. Four activity boards 20, 40, 60 and 80 teach principles relating to the circle, ellipse, parabola and hyperbola, respectively. Each of the boards includes a laminated erasable surface that may be marked with a special pen 100. This pen 100 contains the same type of fluid which allows writing on overhead transparencies. The fluid used in the pen 100 needs to be fast drying to avoid smudges. The pen 100 has a grip holder 101 to make dragging the pen easier. A groove opening 102 in the pen has a magnetic hollow cylinder which rotates freely about the inner casings of the pen 100. When the pen 100 is placed in the pen holder 22, the pen holder 22 slides into the groove 102 and is held in place by the magnet. The free rotation of the cylinder allows circular movement of the pen holder without hindrance. The pen tip 103 is thin enough to fit through the hole in the pen holder 22. The magnetic cylinder in the groove 102 of the pen 100 holds the pen holder 22 in place. This keeps the pen holder 22 from slipping out of place while the pen 100 is in use.

FIGS. 2–5 show the circle activity board 20 and illustrates its use. The user picks up the pen holder 22 (a small metal disk) which is held to the board by a magnetic disk holder 23 under the activity board surface. The user presses the place on the activity board marked Release 24. The user pulls the string 25 to the desired length and then presses Lock 26. Once the string 25 is locked at the desired length, the user inserts the special pen 100 into the pen holder 22 until the pen holder 22 rests in the groove 102 of the pen 100. The user then pulls the string 25 with the pen 100 until the string 25 is taut. The user then travels around the center hole 27 with the pen 100 down on the activity board 20 until a closed region is drawn on the board. This closed region will be a circle. The user may now change the length of the string 25 by pressing Release 24. The string 25 is now adjustable. Once the user has adjusted the string 25 to the newly desired length, the user will then press Lock 26. The user will draw a new circle as described above. The user has now created concentric circles. The user may continue to change the length of the string 25 as described above until the desired amount of concentric circles have been achieved. Then the user is done, he will press Release 24 and the string 25 will retract back into its string dispenser container 30 leaving the pen holder 22 on the top of the activity board. The user places the pen holder 22 next to the center of the circle where it will be held in place by the magnetic disk holder 23. The user then uses a moist paper towel to wipe the activity board clean. The activity board is now ready to be stored away for use at a later time.

The string dispenser container 30 is placed under the activity board 20 and is permanently attached. The string 25 exists its string dispenser container 30 by a small hole 31 on top of the container. The string then exits the underside of the board by a small hole 27 on top of the activity board. The small hole 27 will serve as the center of the circle, on the top of the activity board. The end of the string 25 is then attached to a metal disk which will serve as the pen holder 22 for the pen 100 when the circle is drawn.

Figure 6:
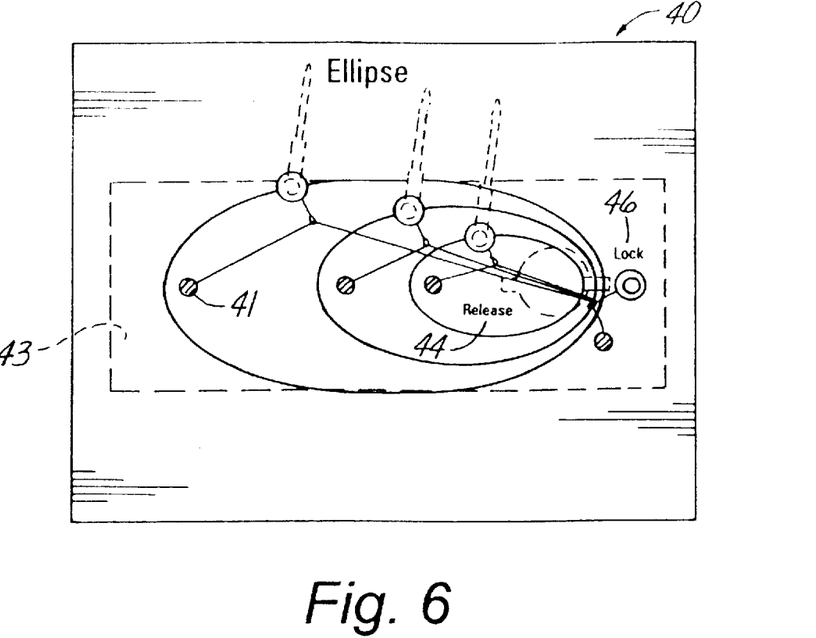
FIG. 6 is a top plan view of the activity board for elliptical conic sections.
Figure 7:
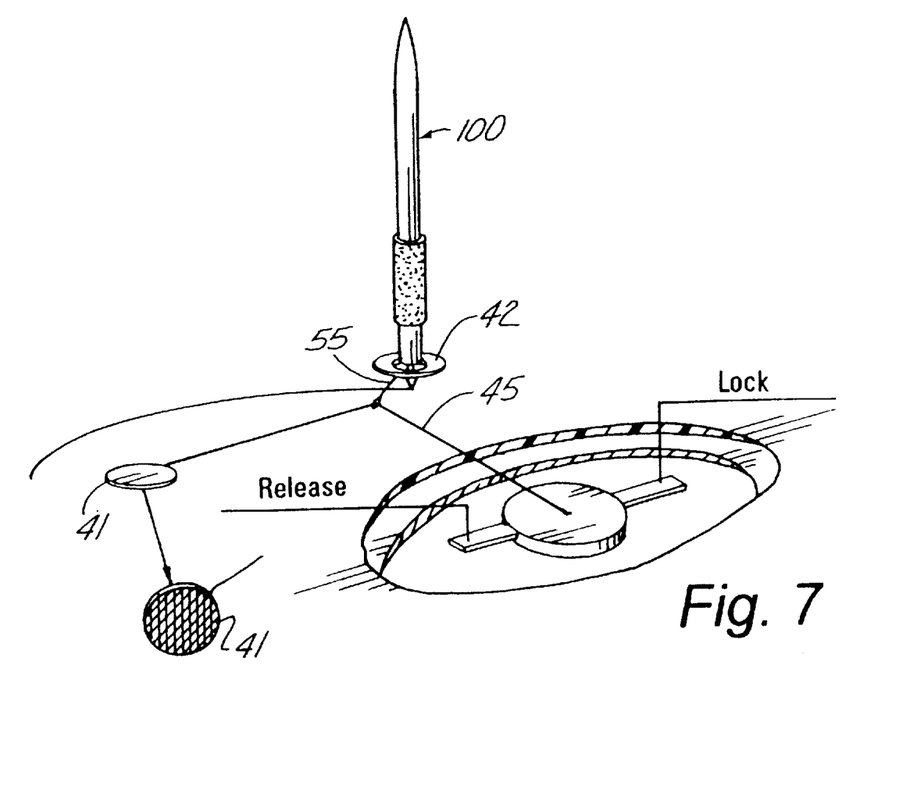
FIG. 7 is a cutaway partial perspective view illustrating the string releasing and locking mechanism used in the activity board of FIG. 6.
Figure 8:
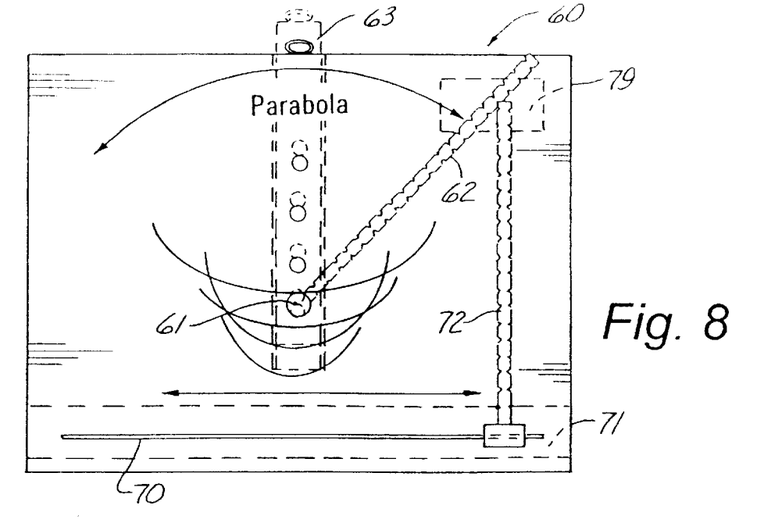
FIG. 8 is a top plan view of the activity board for parabolic conic sections.
Figures 9, 10:
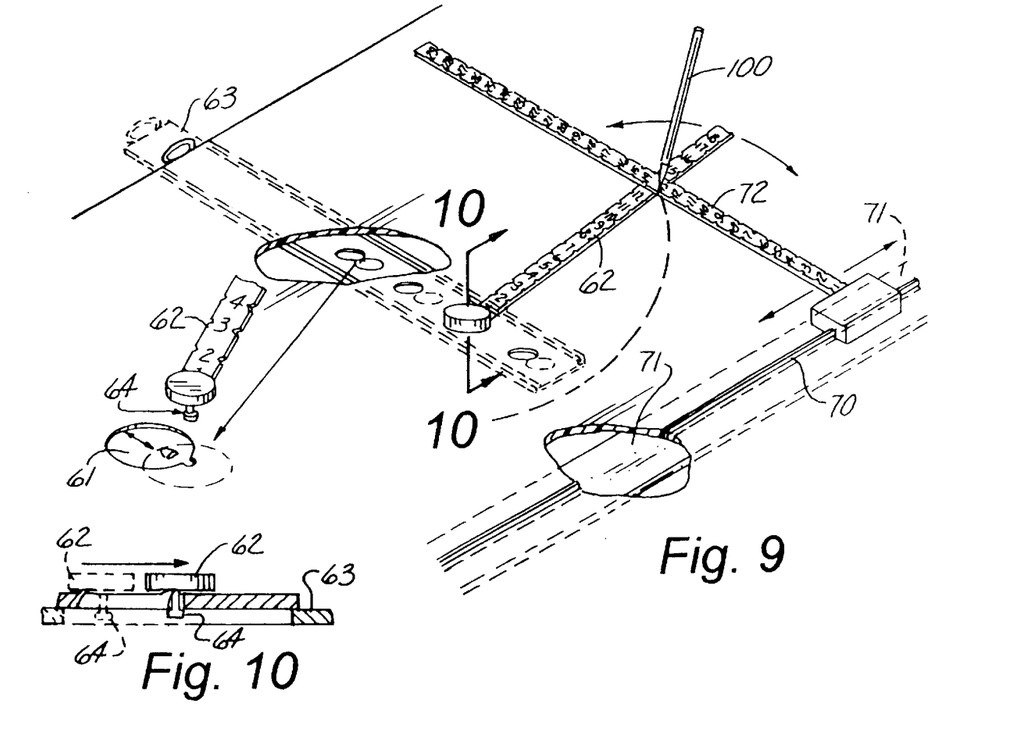
FIG. 9 is a cutaway partial perspective view illustrating the mechanisms for attaching the rulers to the activity board for parabolic shapes.
FIG. 10 is a side elevation sectional view taken along line 10—10 of FIG. 9.
Figure 11:
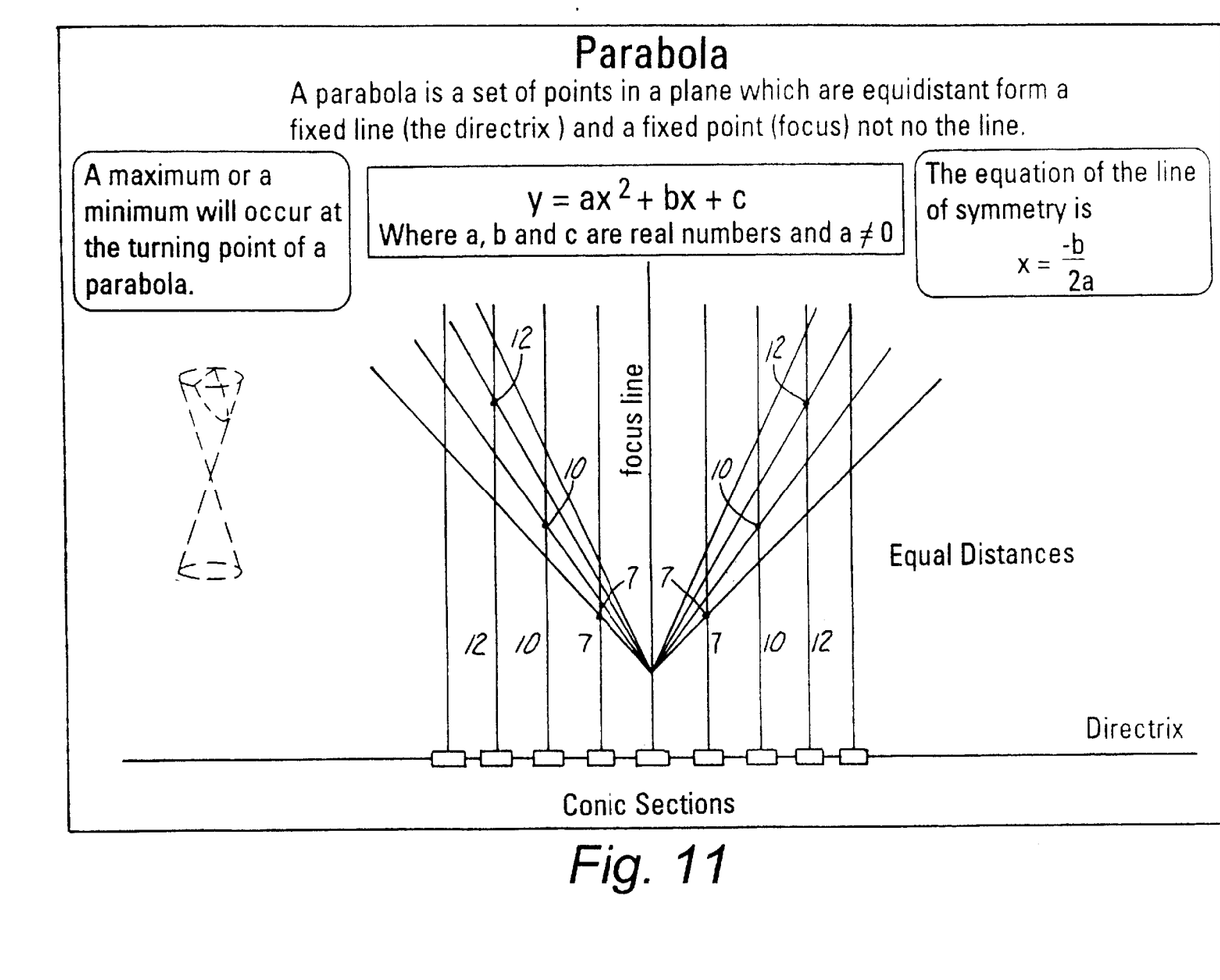
FIG. 11 is a schematic illustrating a procedure for sketching a parabolic shape.

FIGS. 6–7 show the ellipse activity board 40 and illustrates its use. The user lifts the solid metal disk 41 from the top of the activity board where it is held in place by the magnetic strip 43 under the surface of the activity board. The user then presses the place on the activity board marked Release 44. The string 45 can now be pulled out to the desired length and then the Lock 46 mark is pressed. The desired length of the string 45 is now locked into place. The solid metal disk 41 will serve as the second focus point for the ellipse. It will be placed along the horizontal axis of the activity board where the magnetic strip 43 lies directly under the surface. The solid metal disk 41 will be held in place by the magnetic strip 43. The solid metal disk 41 has at its circumference, a non-skid material which assists the magnet 43 in holding the solid metal disk 41 (second focus point) in place. The user is now ready to insert the pen 100 into the pen holder 42. The pen holder is attached to the string 45 by a single string 55. This single string 55 is fastened to the pen holder disk 42 at one end and is fastened to the string 45 by a loop at the other end. This will enable the string 45 to move freely and not twist when the user draws the top half and the bottom half of the ellipse.

The user is now ready to insert the pen 100 into the pen holder 42. The pen 100 should be placed into the pen holder 42 until the pen holder 42 rests in the groove 102 of the pen 100. The user then pulls the pen holder 42 with the pen 100 until the string is taut. With the pen 100 down on the activity board, the user traces around to form a closed region. This closed region will be an ellipse. The user can then lift the solid metal disk 41 from the board and place it at another location along the horizontal axis. Following the above directions, another ellipse can be drawn. The length of the string 45 can also be altered if the user desires by pressing the Release mark 44 enabling the string 45 to lengthen or retract. The user must then press the Lock mark 46 to keep the string 45 at the newly desired length. The user can continue to change the length of the string 45 and the second focus point drawing a new ellipse each time. When the user is done with the activity board, the Release mark 44 is pressed and the string 45 retracts back under the activity board into the string holder. The solid metal disk 41 and the pen holder 42 will be laid flat next to the first focus point where they will be held in place by the magnetic strip 43 which lies under the surface of the activity board. The board can then be wiped clean with a moist paper towel.

FIGS. 8–11 show the parabola activity board 60 and illustrate its use. The user chooses a hole 61 in which the focus ruler 62 will be placed. The user slides the tray 63 out and exposes the indented circular portion of the bottom tray. The user then inserts the base 64 of the ruler holder, for the focus ruler 62, into the hole 61 in the activity board which is exposing the circular indention in the bottom board. The base 64 of the ruler holder will rest on the bottom of the indented circle. The user then slides the tray 63 shut which closes the peg of the ruler holder into the small hole. The ruler 62 now has its base 64 below the board, its peg closed into the hole by the closed tray 63 and the top of the holder and the ruler remain above the activity board. The ruler can now be rotated at the focus point by the user. Below the surface of the activity board running along the directrix 70 is a thin metal strip 71. The strip 71 helps the user glide the base of the directrix ruler 72 along the directrix 70. The directrix 70 will be made of a metal wire. This wire will serve as the line. This wire will rest in a linear groove where half of the wire is in the groove and the other half of the wire is slightly raised above the groove, elevated above the surface of the board. The base of the directrix ruler 72 which has the indention along the line of the directrix will now fit over the raised wire where it can be glided left and right along the wire by the user. The user moves the directrix ruler 72 along the directrix 70 and rotates the ruler 62 at the focus until the two rulers 62, 72 match at equal units. Once the user matches the units on both rulers 62, 72 the notches at that unit on both rulers should be aligned. The user then places the activity pen 100 into the notched area and makes a mark on the board. The user repeats the process of sliding the ruler 72 along the directrix 70 and rotating the ruler 62 at the focus until there are about eight to ten marks on each side (left and right) of the focus point. When the user sketches the curve which passes through these points a parabola is formed. The user may now explore by changing the location of the focus point as described above and repeating this activity. When the user is done with the activity board, the board is wiped clean with a moist paper towel. The focus ruler 62 should be placed into the hole closest to the directrix 70 and the rulers 62, 72 attached to their magnetic holder 79 in the upper right hand corner of the board.

Figure 12:
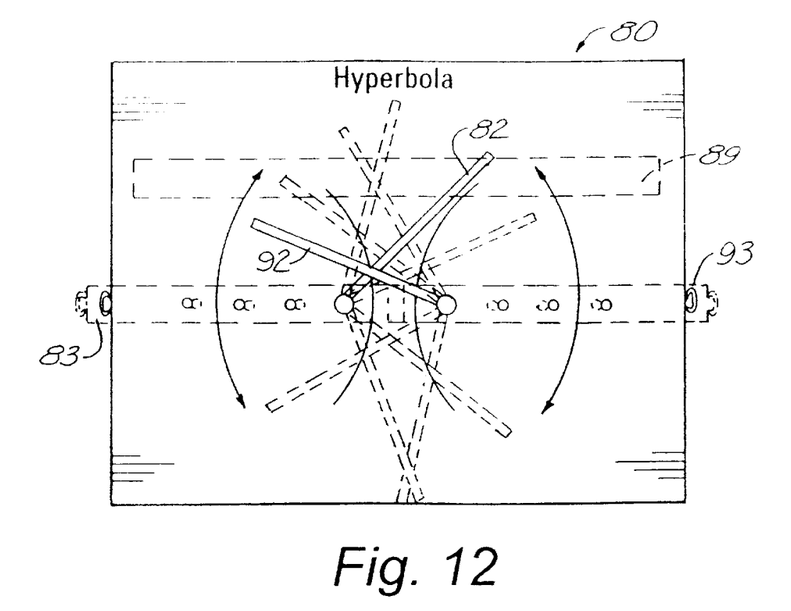
FIG. 12 is a top plan view of the activity board for hyperbolic conic sections.
Figure 13:
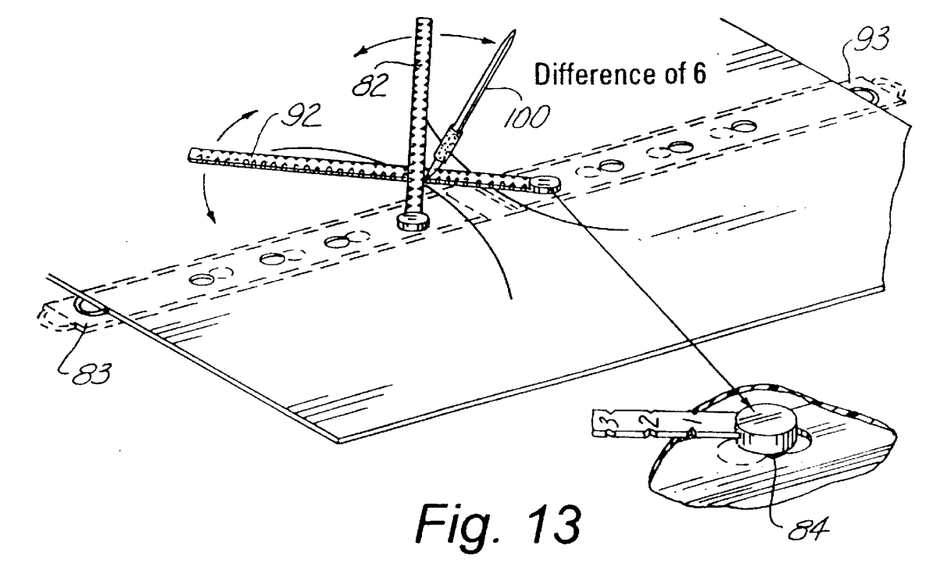
FIG. 13 is a cutaway partial perspective view illustrating the mechanisms for attaching the rulers to the activity board for hyperbolic shapes.
Figure 14:
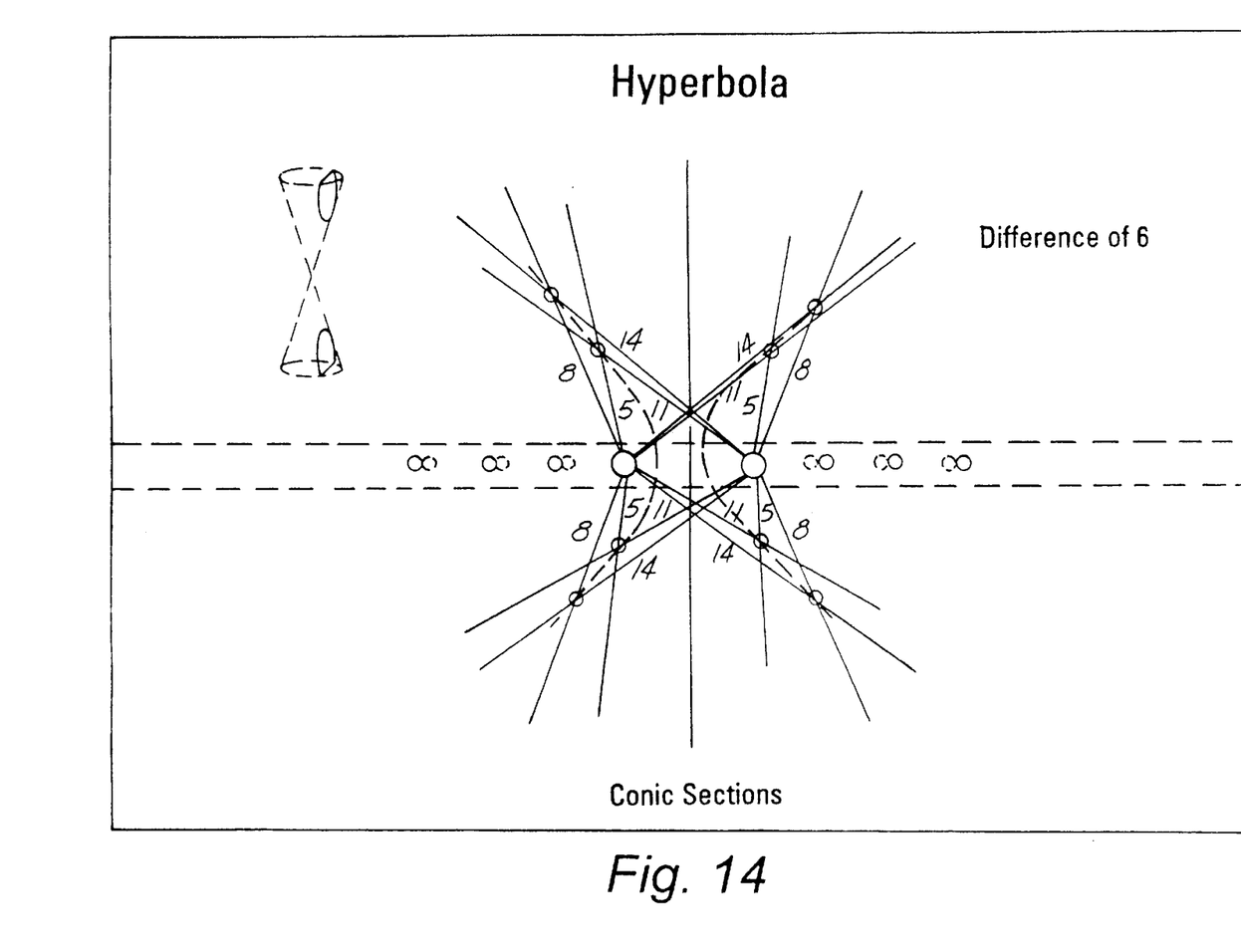
FIG. 14 is a schematic illustrating a procedure for sketching a hyperbolic shape.

FIGS. 12–14 show the hyperbola activity board 80 and illustrate its use. The trays 83, 93, rulers 82, 92, and ruler holders 84 are the same type used with the parabola activity board 60. Two trays 83 are attached to the activity board along the horizontal axis. One ruler 82 will be placed in the left tray 83 and the other ruler 92 in the right tray 93. Each ruler 82, 92 will have a metal tip which will stick to a magnetic strip 89 which lies beneath the surface of the activity board. The user must decide on a difference in length of the rulers 82, 92. Both rulers 82, 92 are rotated so that they intersect at units which calculate out to this difference in length. The rulers 82, 92 are rotated so that all of the four (4) possible points are acquired. A mark is made at the points where the two rulers 82, 92 intersect each time. Using about eight possible combinations for the difference, the user will sketch a curve through the points on the left and then sketch a curve through the points on the right. The curves will form a hyperbola. When the user is done, he wipes the board clean with a moist paper towel. The rulers 82, 92 are rotated so that the tips of the ruler with the metal tip lies on top of the magnetic piece 89 under the surface of the activity board for storage.

The present invention provides reusable activity boards which allow the user to create conic sections by their definitions. The user makes adjustments to the string lengths, the locations of focus points and different measurements to produce a variety of sizes and shapes of conic sections.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

What is claimed is:

1. A conic section activity board, comprising:

a planar board having an erasable upper surface, a lower surface, and an opening formed through a central portion of the board between the upper and lower surfaces;

a string disposed to extend from the lower surface, through the opening, and over the upper surface a predetermined distance, the string having a lower end attached to a dispensing mechanism and an upper end attached to a marker holder; and a marker disposed to be received in the marker holder and being selectively movable over the board to circumscribe a closed region.

2. The activity board of claim 1 wherein the closed region defines a circle having a radius of the predetermined distance.

3. A conic section activity board, comprising:

a planar board having an erasable upper surface, a lower surface, and an opening formed through a portion of the board between the upper and lower surfaces;

a magnetic strip attached to the lower surface of the board and extending from the opening in a line laterally across the board;

a string disposed to extend from the lower surface, through the opening, and over the upper surface a predetermined distance, the string having a lower end attached to a dispensing mechanism and an upper end attached to a metal disc, the metal disc being selectively secured to the upper surface of the board along the lateral line by the magnetic strip;

a single string having one end attached to the string and being movable between the opening in the board and the metal disc, the single string having another end attached to a marker holder; and a marker disposed to be received in the marker holder and being selectively movable over the board to circumscribe a closed region.

4. The conic section activity board of claim 3 wherein the closed region defines an ellipse having a first focus at the opening in the board and a second focus at the metal disc.

5. A conic section activity board, comprising:

a planar board having an erasable upper surface, a lower surface, and a plurality of aligned openings formed through a portion of the board between the upper and lower surfaces;

a first ruler having one end pivotally attached to one of the plurality of aligned openings;

a raised guide attached to the upper surface of the board and disposed perpendicular to the plurality of aligned openings;

a second ruler having one end movably attached to the guide, and being disposed to extend parallel to the plurality of aligned openings; and a marker selectively disposed to mark the upper surface of the board at a plurality of points where the first and second rulers intersect at lengths of a predetermined ratio, whereby connecting the marked points defines a parabola.

6. A conic section activity board, comprising:

a planar board having an erasable upper surface, a lower surface, and a plurality of aligned openings formed through a portion of the board between the upper and lower surfaces;

a first ruler having one end pivotally attached to one of the plurality of aligned openings;

a second ruler having one end pivotally attached to another of the plurality of aligned openings; and a marker selectively disposed to mark the upper surface of the board at a plurality of points where the first and second rulers intersect at lengths of a predetermined length differential, whereby connecting the marked points defines a hyperbola.

* * * * *